United States Patent [19]

Tsuchiya

[11] Patent Number: 4,710,860

[45] Date of Patent: Dec. 1, 1987

[54] RIPPLE-FREE DC HIGH VOLTAGE GENERATING APPARATUS FOR X-RAY TUBE

[75] Inventor: Akira Tsuchiya, Ootawara, Japan

[73] Assignee: Kabushiki Kaisha Toshiba, Kawasaki, Japan

[21] Appl. No.: 800,319

[22] Filed: Nov. 21, 1985

[30] Foreign Application Priority Data

Nov. 26, 1984 [JP] Japan ................................ 59-250350
Dec. 7, 1984 [JP] Japan ................................ 59-257404

[51] Int. Cl.⁴ ............................................ H02M 3/315

[52] U.S. Cl. ........................................ 363/28; 363/96; 378/110; 378/112

[58] Field of Search ....................... 363/27, 28, 79, 96, 363/136; 378/110, 112, 101; 323/259, 263, 293

[56] References Cited

U.S. PATENT DOCUMENTS

| | | | |
|---|---|---|---|
| 2,213,112 | 8/1940 | Timmons . | |
| 3,295,053 | 12/1966 | Perrins | 323/263 |
| 3,527,947 | 9/1970 | Weisglass et al. | 378/110 |
| 4,184,075 | 1/1980 | Ebersberger . | |
| 4,221,968 | 9/1980 | Franke . | |
| 4,225,788 | 9/1980 | Franke . | |
| 4,266,134 | 5/1981 | Franke et al. . | |
| 4,295,049 | 10/1981 | Ebersberger et al. . | |
| 4,323,959 | 4/1982 | Check | 363/136 |
| 4,497,018 | 1/1985 | Rice | 363/136 |
| 4,504,895 | 3/1985 | Steigerwald | 363/17 |

FOREIGN PATENT DOCUMENTS

| | | | |
|---|---|---|---|
| 0096843 | 12/1983 | European Pat. Off. . | |
| 0047957 | 9/1984 | European Pat. Off. . | |
| 66278 | 5/1980 | Japan | 363/27 |

*Primary Examiner*—William H. Beha, Jr.
*Attorney, Agent, or Firm*—Finnegan, Henderson, Farabow, Garrett and Dunner

[57] ABSTRACT

A bridge inverter arrangement for use with high-voltage generators for X-ray apparatus includes a single phase transformer having primary and secondary windings, a capacitor series-connected via a current-limiting resistor to the primary winding so as to constitute a series resonant circuit, a bridge inverter having series-connected thyristors for inverting DC low voltage into pulsating low voltage, and a switching controller for controlling turn-on times of the thyristors. A switching circuit is connected in parallel to the resistor. The switching circuit is controlled under the switching controller in response to switching signals for the thyristors so as to vary the value of the pulsating low voltage, thereby changing the value of high AC voltage induced at the secondary winding and reducing the ripple components contained therein. A second embodiment of the invention includes an inductor connected in series with the primary winding, and the switching circuit is connected in parallel with the primary winding.

7 Claims, 17 Drawing Figures

I
(= I1 + I2)

GP1
GP2
GP3,4

I1
T1
TO
I2

I1'
T2
I2'

RIPPLE-FREE DC HIGH VOLTAGE GENERATING APPARATUS FOR X-RAY TUBE

BACKGROUND OF THE INVENTION

1. Field of the Invention

The present invention relates in general to an apparatus for generating a DC high voltage for application to an X-ray tube. More particularly, this invention is directed to a DC high voltage generator employing a series, resonance type, bridge inverter suitable for use in a diagnostic X-ray apparatus.

2. Description of the Prior Art

A need to produce stable X-rays is strongly felt in the field of diagnostic X-ray apparatus. A major solution aimed at achieving such stable X-ray generation is that of continuously applying a stable DC high voltage, which does not contain ripple components, to an X-ray tube. Such a DC high voltage generator employing a series, resonance type, bridge inverter is known from, for instance, U.S. Pat. No. 4,225,788 to Franke, issued on Sept. 20, 1980.

The conventional DC high voltage generator rectifies and smoothes an AC voltage supplied from a power source (in general, a commercial power source) so as to obtain a DC voltage. The obtained DC voltage is alternately switched by series-connected first and second thyristors, and the switching voltages are applied to a resonant circuit consisting of a resonance capacitor connected in series with the primary winding of a transformer, thereby inducing attenuated oscillation. Thus, a DC high voltage for an X-ray tube is obtained based upon the AC high voltage induced in the secondary winding of the transformer.

The level of the high X-ray tube voltage in the DC high voltage generator can be varied by changing turn-on periods of the first and second thyristors. However, when the high X-ray tube voltage is varied by changing the turn-on periods of the thyristors, the following problems occur. FIGS. 1 and 2 are waveform charts showing the relationship between a gate pulse of the thyristors and current flowing through a transformer winding upon switching the first and second thyristors. Referring to FIGS. 1 and 2, "a" indicates current flowing in the turn-ON state of the first thyristor, and "b" indicates current flowing upon turning ON the second thyristor. Note that a hatched portion represents current flowing in an opposite direction due to the attenuated oscillation of the series resonant circuit.

As shown in FIG. 1, when repetition periods of gate pulses GP1 and GP2, applied to the gates of the first and second thyristors, are short (at a maximum turn-on frequency), current continuously flows through the primary winding of the transformer. Therefore, the X-ray tube voltage is increased and ripple components contained in this higher X-ray tube voltage are relatively reduced.

However, when the repetition periods of gate pulses GP1 and GP2, applied to the gates of the fifst and second thyristors, are long (at a mininum turn-on frequency) as shown in FIG. 2, the current intermittently flows through the primary winding of the transformer. For this reason, the X-ray tube voltage is reduced. In addition, ripple components contained in this lower X-ray tube voltage are increased in comparison to those in the higher X-ray tube voltage.

Therefore, when the X-ray tube voltage is varied by changing the turn-on periods of the first and second thyristors, it is known that the ripple components increase as the X-ray tube voltage decreases. In this manner, if a large number of ripple components are contained in the X-ray tube voltage, the X-ray dose generated from the X-ray tube is reduced, and a good X-ray photograph cannot be obtained, a particularly disadvantageous result, in mammography which is performed in a low X-ray voltage range.

Another serious problem exists in that the variable range of an X-ray tube voltage may differ in accordance with a load, i.e., an X-ray tube circuit. FIG. 3 shows the variable range of tube voltage (kV) with respect to a turn-on period ($\tau$) of the above-described thyristor, using respective tube currents as parameters. As can be seen from FIG. 3, as the tube current is decreased, i.e., in a low load state such as fluoroscopy, the tube voltage variable range is narrowed. On the other hand, when the tube current is large, i.e., in a heavy load state such as X-ray radiography, the tube voltage variable range is widened.

Conventionally, a DC/DC converter and other phase controls using a thyristor have been proposed as methods for varying an input voltage to a transformer so as to vary the tube voltage. However, in this case, the number of circuit elements is increased, resulting in a large, expensive apparatus, and generation of noise.

SUMMARY OF THE INVENTION

It is therefore an object of the present invention to provide an inexpensive, compact DC high voltage generating apparatus for an X-ray tube, which can vary an X-ray tube voltage over a wider range in a relatively simple manner.

It is another object of the present invention to provide a DC high voltage generating apparatus which can obtain a sufficient variable voltage range and a stable tube voltage even if a single phase AC power supply containing a great number of ripple components is employed as the input source.

To achieve the objects and in accordance with the purpose of the invention, as embodied and broadly described herein, the DC high voltage generating apparatus of this invention for an X-ray tube comprises: a primary rectifier for rectifying a low AC voltage to derive a low DC voltage; a bridge inverter means including a single phase transformer having primary and secondary windings, a capacitive element series-connected via a current limiter to the primary winding so as to constitute a series resonant circuit, a bridge inverter circuit having switchable elements for inverting the low DC voltage into a pulsating low voltage, and a switching controller for controlling the switch-on times of the switchable elements; a secondary rectifier for rectifying a high AC voltage induced at the secondary winding of the transformer by the pulsating low voltage into a high DC voltage for the X-ray tube; and switching means connected in parallel to the current limiter of the bridge inverter means, for changing the value of the pulsating low voltage induced at the primary winding by short-circuiting the current limiter so as to vary the high DC voltage derived from the secondary rectifier means.

BRIEF DESCRIPTION OF THE DRAWINGS

The aforementioned aspects and other features of the invention are explained in the following description, taken in connection with the accompanying drawings, in which.

DETAILED DESCRIPTION OF THE PREFERRED EMBODIMENTS

Figure 1:
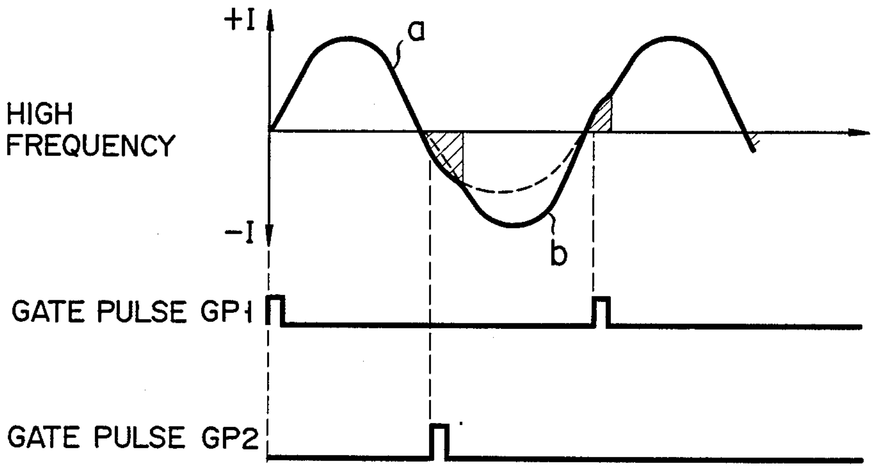
FIG. 1 (PRIOR ART)
FIGS. 1, 2 and 3 are waveforms and graphs for explaining how the conventional thyristor bridge inverter works.

A first embodiment of the present invention will be described hereinafter with reference to FIG. 4. A DC high voltage generating apparatus 100 shown in FIG. 4 according to the invention is mainly constituted by the following circuit elements. A first rectifier bridge circuit 22 includes a rectifier circuit 2 having bridge rectifiers *2a, 2b, 2c,* and *2d,* and a filtering circuit 3 having series-connected filtering capacitors *3a* and *3b*. A transformer 6 has primary and secondary windings *6a* and *6b*. A resonance capacitor 5 is connected between the primary winding *6a* of the transformer 6 and a node between the capacitors *3a* and *3b*. The capacitor 5 forms a resonant circuit in combination with the primary winding *6a* and a resistor 30 serving as a current limiter. A bridge circuit 20 has diodes 13 and 15 and thyristors 12 and 14 which are bridge connected, and supplies the output from the circuit 22 to the resonant circuit at predetermined intervals. A controller 19 supplies driver pulses to the thyristors 12 and 14 of the circuit 20, and to a switching circuit 31 (to be described later). The switching circuit 31 is parallel-connected to the resistor 30 as a current limiter which is connected in series with the above described resonant circuit. A first detector (e.g., a current transformer) 16 detects the current flowing through the primary winding *6a*. An I/V (current-/voltage) converter 17 converts the detection current of the detector 16 into a voltage signal. The capacitor 5, the transformer 6, the circuit 20, the controller 19, the detector 16 and the converter 17 constitute a series resonant type bridge inverter 21.

A second rectifier bridge circuit 23 includes a bridge type rectifier circuit 7 for rectifying a voltage induced in the secondary winding *6b* of the transformer 6, and a capacitor 8 for filtering the output from the circuit 7. High voltage cables *10a* and *10b* apply the DC output voltage from the circuit 23 to an anode *9a* and a filament *9b* of an X-ray tube 9. A second detector 11 detects the X-ray tube voltage.

The second detector 11 includes resistors *11a* and *11b* connected in series with each other between the output terminal of the circuit 23 and ground. The detector 11 detects the voltage by subdividing the X-ray tube voltage using the resistors *11a* and *11b,* and controls the controller 19 based upon the detection result.

Figure 5:
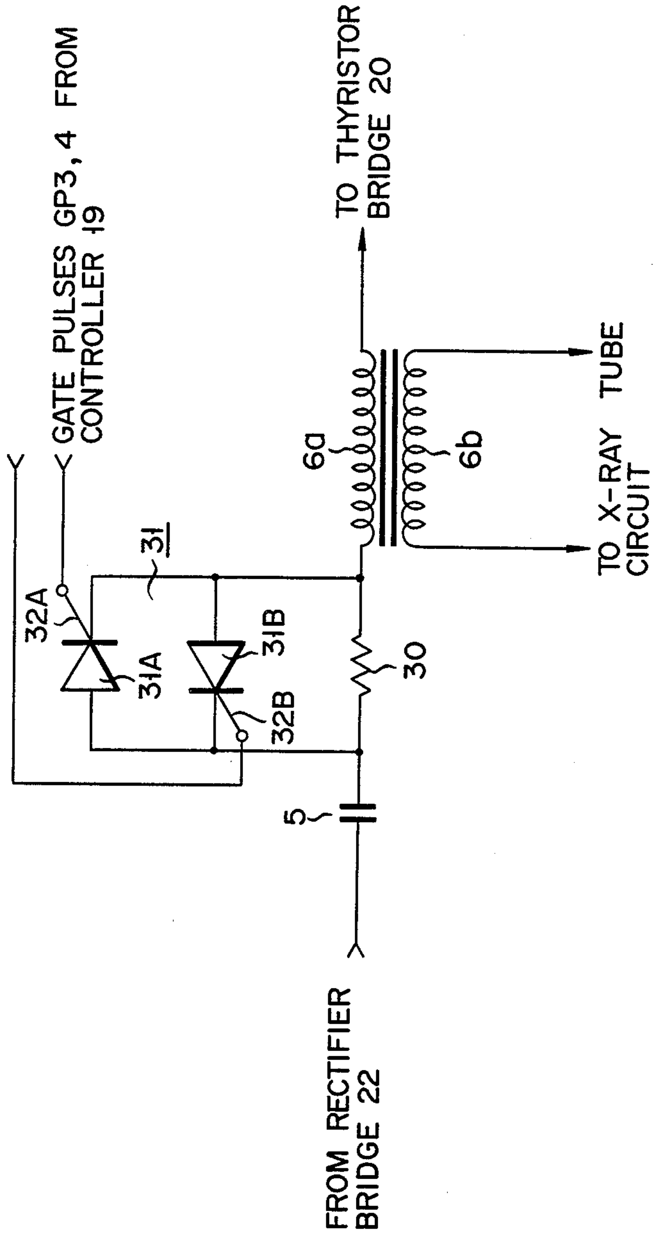
FIG. 5 is a detailed circuit diagram of the switching circuit employed in FIG. 4.

An example of the above-mentioned switching circuit 31 will be described in detail with reference to FIG. 5. The circuit 31 is constituted by cross-coupled high-speed thyristors 31A and 31B. Gate pulses GP3 are applied to gate electrodes 32A and 32B of the thyristors 31A and 31B, respectively, at desirable timings to be described later in accordance with positive and negative polarities of these thyristors. That is, when the primary current flows from the resonance capacitor 5 side to the primary winding *6a* side, the gate pulses GP3 are applied to the electrode 32A of the thyristor 31A turning it on. When the primary current flows in the opposite direction, the gate pulses GP3 are applied to the electrode 32B of the other thyristor 31B at the desired timing, thereby turning it on.

The operation of the DC high voltage generating apparatus 100 shown in FIGS. 4 and 5 will be explained hereinafter.

At first, the operation of the conventional generating apparatus in which the resistor 30 as a current limiter is not connected in series with the series resonance circuit, is considered. In this case, if a short circuit is formed by simply actuating the switching circuit 31, the circuit of the present invention becomes equivalent to the conventional circuit configuration. As a method for forming a short circuit by simultaneously and continuously turning on the thyristors 31A and 31B in this manner is well known, a detailed description thereof is omitted. The AC input voltage supplied from the AC power supply 1 is converted into a DC voltage by the rectifier bridge circuit 22, and is applied to the circuit 20. The thyristors 12 and 14 in the circuit 20 are alternately switched in response to gate pulses GP1 and GP2 produced by the controller 19 at predetermined frequencies, as will be described later.

When the thyristor 12 is turned on first, the current based upon the DC voltage from the capacitor *3a* flows in the primary winding *6a* through the thyristor 12 during half cycles (forward direction). Then, the thyristor 12 is turned off by attenuated oscillation determined by the capacitor 5 and the primay winding *6a* (strictly speaking, the secondary side of the transformer also has an influence, and the current of the succeeding half cycles (reverse direction) flows through the diode 13. Thus, when the thyristor 12 is turned on once, the primary current for one period flows in the primary winding *6a*.

Similarly, when the thyristor 14 is turned on, the primary current for one period flows in the primary winding *6a*. However, the flow direction of the current is opposite to that when the thyristor 12 is turned on, and the current of the pulsating low voltage exhibits the primary current waveforms shown in FIGS. 1 and 2.

When the primary current of the pulsating low voltage flows in the primary winding *6a,* an AC high voltage is induced in the secondary winding *6b*. The induced voltage is rectified by the rectifier circuit 7 and is filtered by the capacitor 8. Thereafter, the filtered voltage is applied as the X-ray tube voltage between the anode *9a* and the filament *9b* of the X-ray tube 9.

Thus, X-ray radiation is performed by the X-ray tube 9. In general, however, since an X-ray tube voltage is at several tens of kilovolts and an X-ray tube current is at several hundreds of microamperes, a high primary current of about several hundreds of amperes (peak value) instantaneously flows in the primary winding 6a of the transformer 6 during the X-ray radiation.

A case will now be described wherein a parallel circuit of the resistor 30 and the switching circuit 31 is inserted in series with the series resonance circuit as a main feature of the present invention, and the switch-on timing of the circuit 31 is varied. When the circuit 31 is turned off, the primary current flowing through the primary winding 6a has current waveforms analogous to those shown in FIGS. 1 and 2 of the conventional circuit. However, this primary current is more or less decreased because the resistor 30 is connected to the resonant circuit. That is, the resistor 30 serves as a current limiter, and the primary current has waveforms indicated by broken lines in FIGS. 6 and 7.

Meanwhile, when the switching circuit 31 is turned on, the primary current flowing through the primary winding 6a bypasses the resistor 30. The resultant primary current has the same waveforms and values shown in FIGS. 1 and 2, as indicated by dot and dash lines in FIGS. 6 and 7.

Figure 2:
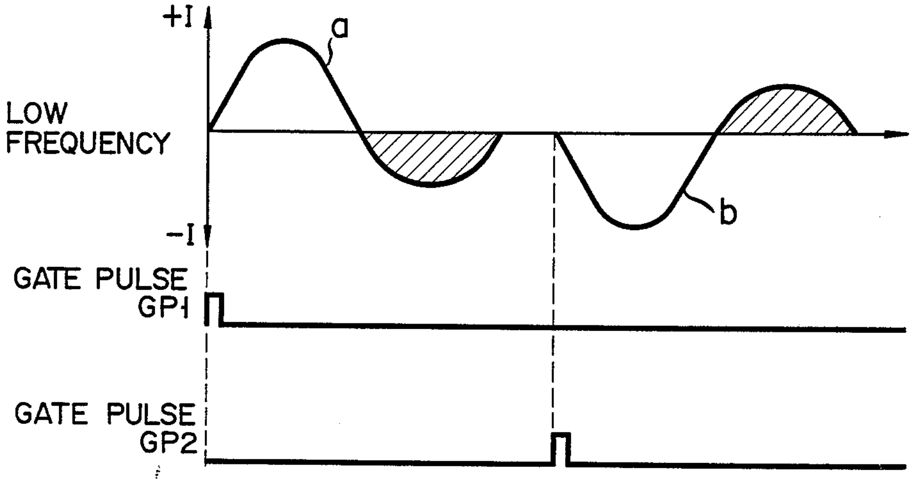
FIG. 2 (PRIOR ART)
Figure 3:
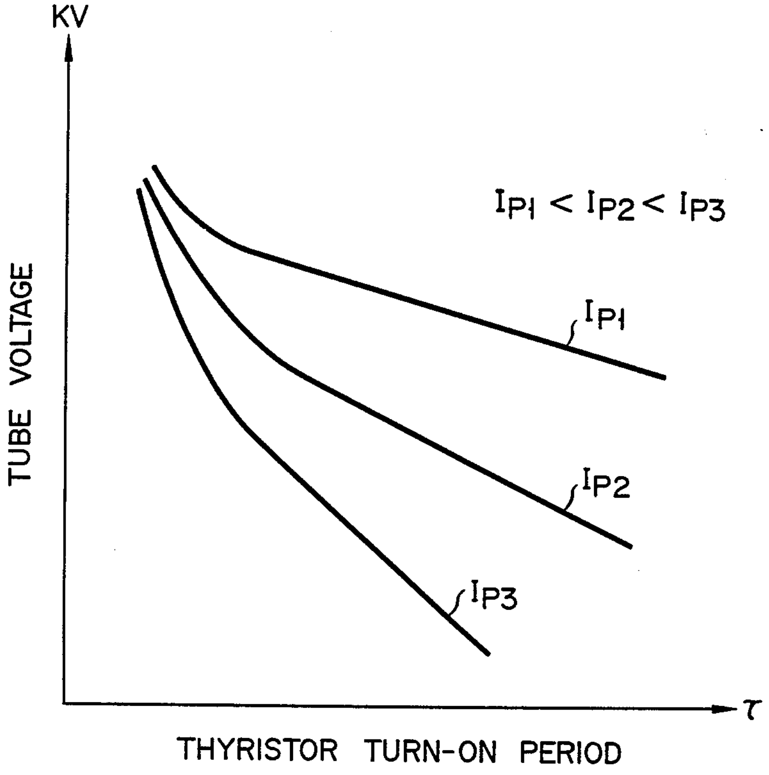
Figure 6:
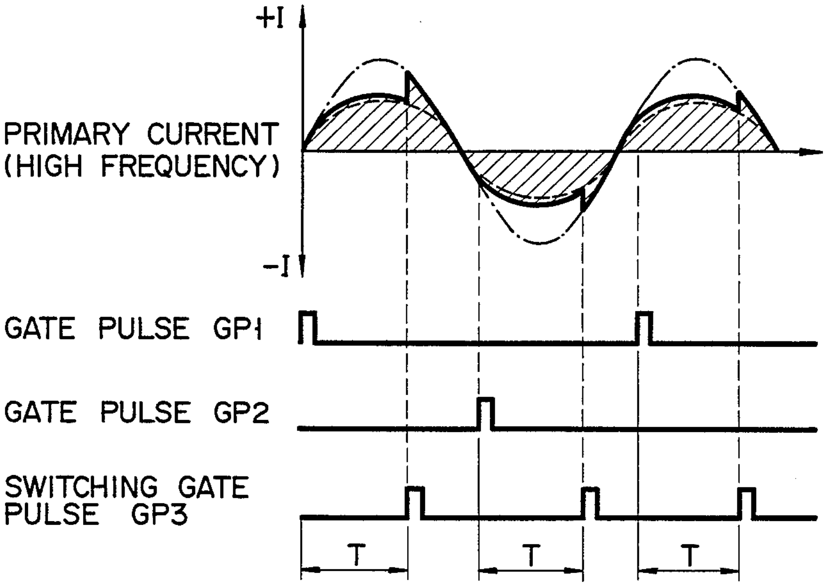
FIGS. 6 and 7 show primary current and pulse waveforms of the circuit shown in FIG. 4.
Figure 7:
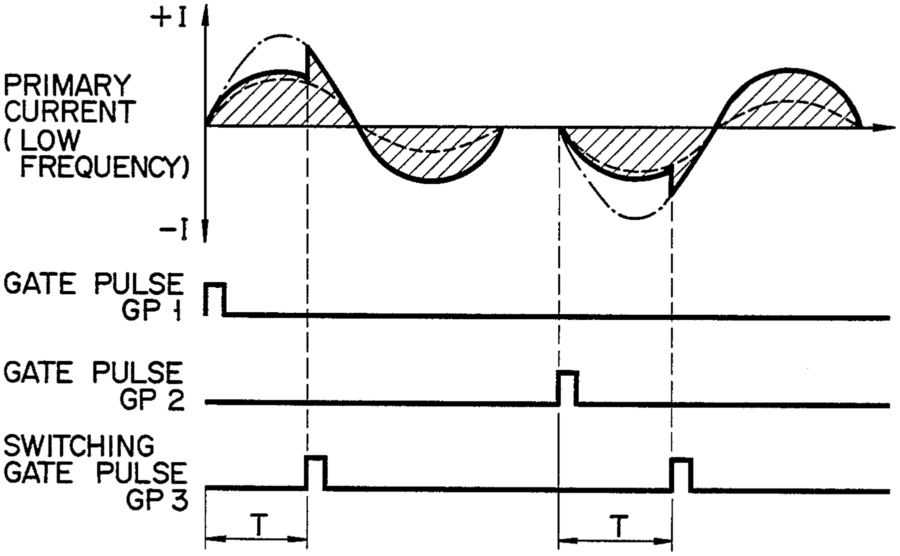

It should be noted that FIGS. 6 and 7 show the primary current waveforms of high and low turn-on frequencies (i.e., short and long periods) corresponding to FIGS. 1 and 2 respectively.

In the current waveforms shown in FIGS. 6 and 7, when the switching circuit 31 is turned on at an arbitrary time in one impulse of the waveforms, the level of the primary current is immediately increased or decreased (as shown in hatched regions). When the switching circuit 31 is rendered inoperative, the primary current has the waveforms indicated by broken lines. However, when the switching circuit 31 is operated at an arbitrary time, the waveforms are switched to those indicated by the dot and dash lines. When the switch-on time of the switching circuit 31 is varied, the level of the primary current (effective value) can be varied.

Figure 8:
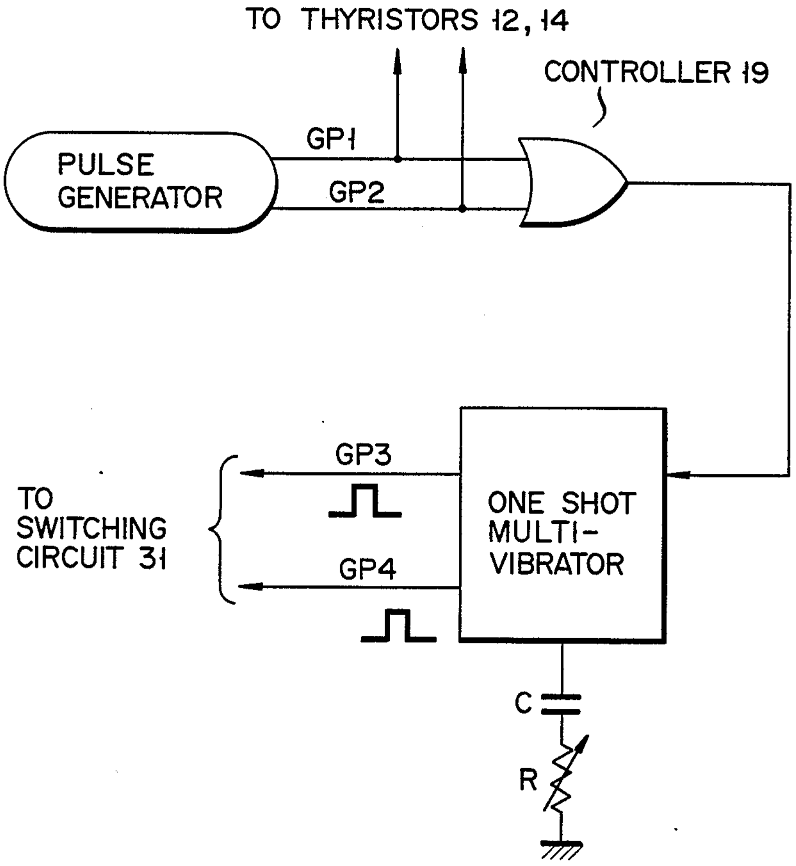
FIG. 8 is a block diagram of the controller shown in FIG. 4.

Therefore, when the switching circuit 31 is operated at an arbitrary time in one impulse of the primary current waveform, the output AC voltage, i.e., the X-ray tube voltage can be controlled. The gate pulses GP1 and GP2 supplied from the controller 19 are delayed by T seconds by a circuit shown in FIG. 8, thereby obtaining the drive pulse GP3 for the switching circuit 31. This delay time can be freely set by changing a time constant of a RC circuit connected to the one shot multivibrator.

As previously described, the X-ray tube voltage can be varied by changing turn-on periods of the thyristors 12 and 14 or by controlling the switch-on timing of the switching circuit 31. However, the former method (carried out in the conventional apparatus) causes ripple components to be increased in the X-ray tube voltage. Therefore, according to the present invention, repetition periods of the gate pulses GP1 and GP2 applied to the gates of the thyristors 12 and 14 are selected as short as possible so that the thyristors are operable at near the maximum turn-on frequencies. Thus, the switch-on timing of the switching circuit 31 is preferably controlled by the latter method so as to vary the X-ray tube voltage. A variable range of the X-ray tube voltage may be further widened in combination of the former and latter methods.

Operations of the DC high voltage generating apparatus 100 according to the first preferred embodiment of the inventive will now be summarized.

The DC high voltage generating apparatus 100 comprises a rectifier bridge circuit for obtaining a DC voltage by rectifying and filtering an AC input voltage, a series resonance type bridge inverter, and a high voltage transformer for applying an output from the bridge inverter to an X-ray tube. The bridge inverter has the transformer, a capacitor forming a resonant circuit together with the primary winding of the transformer, a bridge circuit for applying the DC voltage to the resonant circuit at predetermined intervals, and a controller for supplying drive pulses to the bridge circuit so as to control timing of the supply of the DC voltage from the bridge circuit to the resonant circuit. A resistor is inserted in series with the series resonant circuit and a switching circuit is connected in parallel with the resistor. The apparatus 100 is characterized in that since a switch-on time of the switching circuit can be delayed by an arbitrary time from the time of the supply of the drive pulses to the bridge circuit, the DC high tube voltage can be varied in a wide range without having the ripple components.

Figure 9:
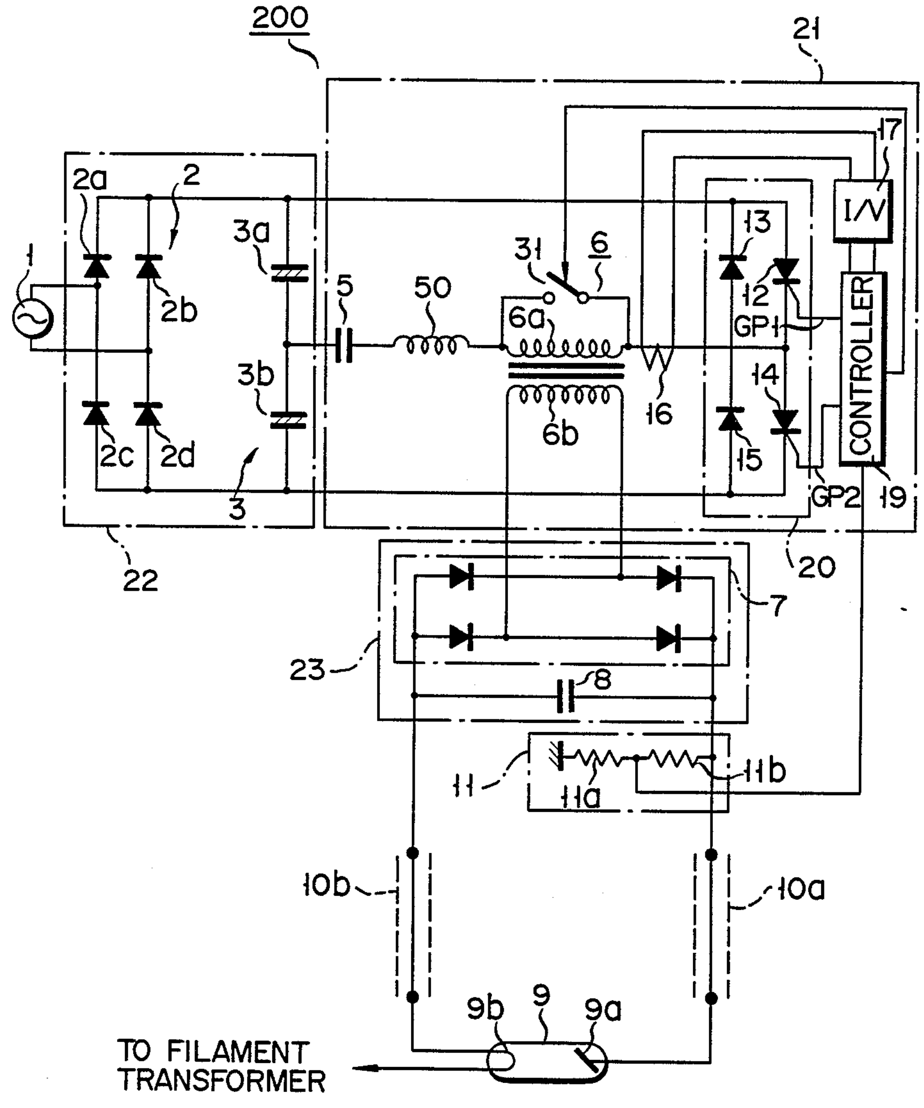
FIG. 9 is a circuit diagram of a DC high voltage generating apparatus constructed according to a second preferred embodiment of the present invention.

Referring now to FIG. 9, a DC high voltage generating apparatus 200 according to a second preferred embodiment of the present invention will be described.

Figure 4:
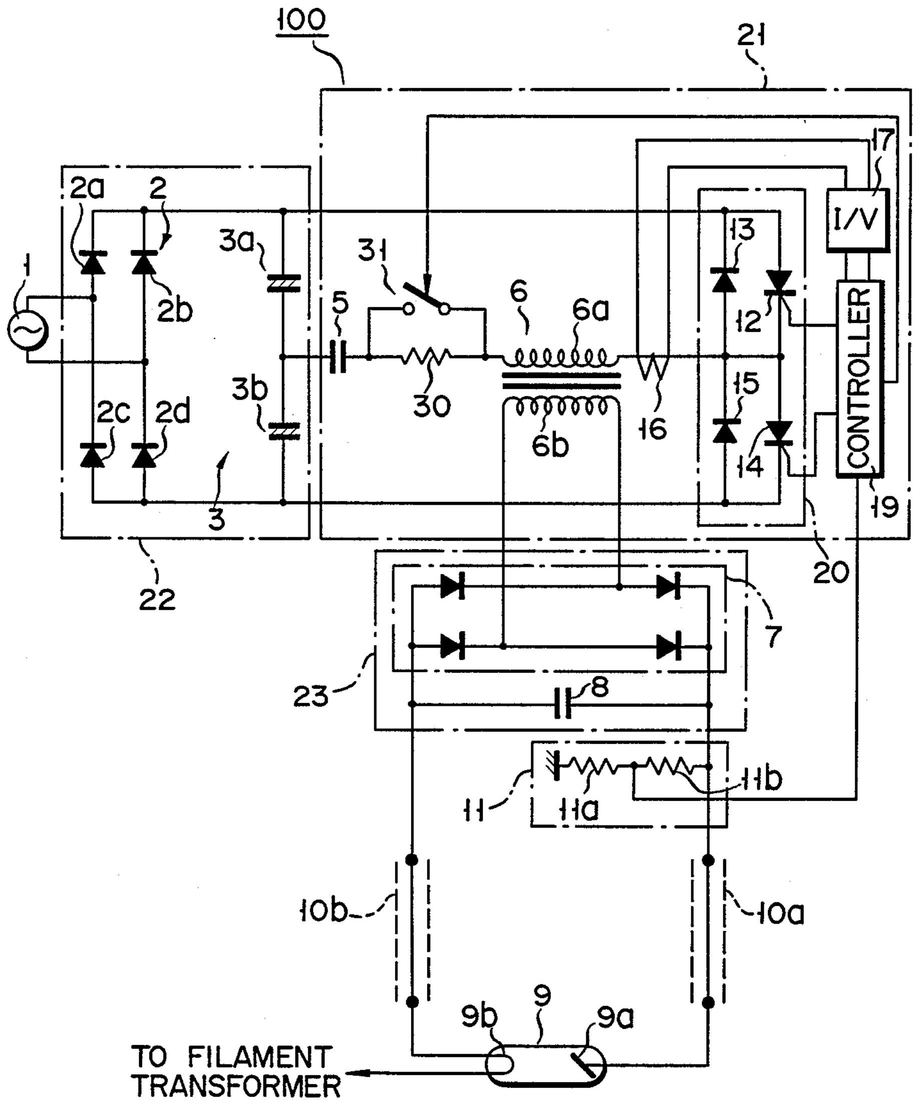
FIG. 4 is a circuit diagram of a DC high voltage generating apparatus constructed according to a first preferred embodiment of the present invention.

It should be noted that the same reference numerals are used in FIG. 9 for the same or similar circuit elements shown in FIG. 4.

In the series resonant circuit including the capacitor 5 and the primary winding 6a of the transformer 6, an inductor 50 is interposed therein. The switching circuit 31 is connected in parallel with the primary winding 6a. Since the construction of the switching circuit 31 is the same as that of the FIGS. 4 and 5, no further explanation is made in the specification.

Operation of the generating apparatus 200 according to the second embodiment will be explained with reference to waveform charts of FIGS. 10A to 10D.

In the high DC voltage generating apparatus 200 which is equivalent to a conventional apparatus in which the switching circuit 31 connected in parallel with the primary winding 6a of the transformer 6 is not turned on, an AC input voltage supplied from the power supply 1 is converted into a DC voltage by the rectifier bridge circuit 22 and is applied to the thyristor bridge circuit 20. In this case, the thyristors 12 and 14 are alternately switched in response to the drive pulses of predetermined frequencies to produce a pulsating low voltage at the primary winding 6a.

When the thyristor 12 is turned on first at a predetermined time instant, the current based upon the DC voltage from the capacitor 3a flows in the primary winding 6a through the thyristor 12 during the half cycle (forward direction). Then, the thyristor 12 is turned off by the attenuated oscillation determined by the capacitor 5 and the primary winding 6a (strictly speaking, the secondary winding 6b of the transformer and the inductor 50 also have an influence thereupon, and the current of the succeeding half cycle (reverse direction) flows through the diode 13. Thus, when the thyristor 12 is turned on once, the primary current for one period flows in the primary winding 6a.

Figures 10A, 10B, 10C, 10D:
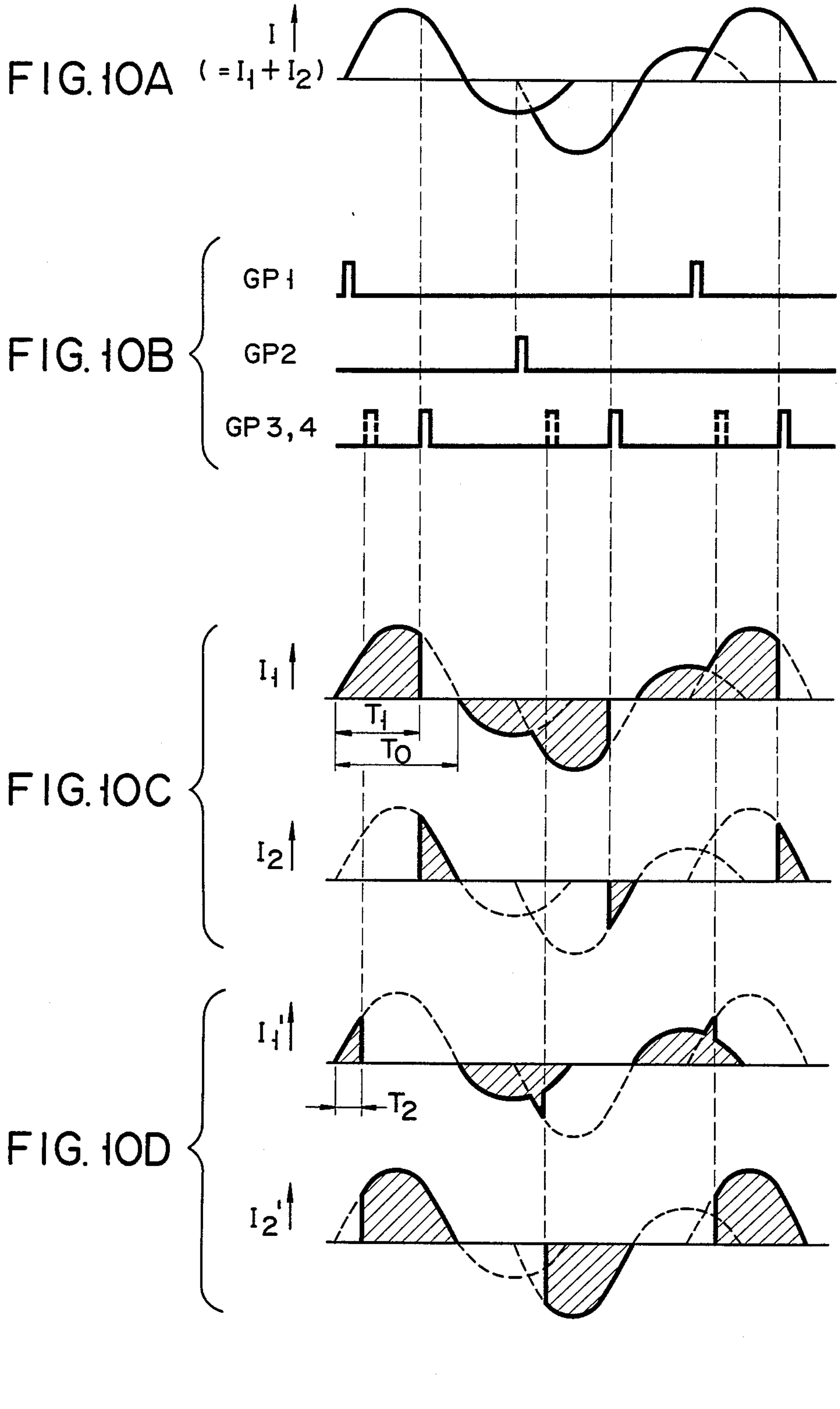
FIGS. 10A to 10D show current waveforms flowing through the apparatus shown in FIG. 9.

Similarly, when the thyristor 14 is turned on at a predetermined time instant, the primary current for one period flows in the primary winding 6a (see FIG. 10D).

However, the direction of the current is opposite to that when the thyristor 12 is turned on.

When the primary current flows in the primary winding *6a*, an AC high voltage is induced in the secondary winding *6b*. The induced AC high voltage is rectified by the circuit 7 and is filtered by the capacitor 8. Thereafter, the filtered DC high voltage is applied as the X-ray tube voltage between the anode *9a* and the filament *9b* of the X-ray tube 9.

Thus, X-ray radiation is effected from the X-ray tube 9. As described above, however, since an X-ray tube voltage is at several tens of kilovolts and an X-ray tube current is at several hundreds of microamperes, the high primary current at about several hundreds of amperes (peak value) instantaneously flows in the primary winding *6a* of the transformer 6 during the X-ray radiation.

Then, a case will be described wherein the switching circuit 31, as the main feature of the present invention, connected in parallel with the primary winding *6a* of the transformer is operated. When the switching circuit 31 is turned off, the primary current as described above flows through the primary winding *6a*. However, when the switching circuit 31 is turned on, the primary current bypasses the primary winding *6a*, and a voltage is not induced in the secondary winding *6b* of the transformer 6. In this case, since the inductor 50 is connected in series with the circuit 31, the current in a short-circuiting condition of the primary winding *6a* can be buffered to a some extent, and damage in circuit elements can be prevented. That is, the inductor 50 serves as a current limiter.

Therefore, when the switching circuit 31 is turned ON at an arbitrary time in one impulse of the primary current waveform, e.g., at a time instant T1, the primary current has the waveform shown in FIG. 10C. In addition, when the circuit 31 is turned ON at a time instant T2, the primary current has the waveform shown in FIG. 10D, and the output voltage, i.e., the X-ray tube voltage can be controlled. Such a gate pulse GP3 or GP4 can be obtained by delaying an OR gate signal of drive pulses GP1 and GP2 supplied from the controller 19 shown in FIG. 8 by T seconds by a one-shot multivibrator.

Figure 11:
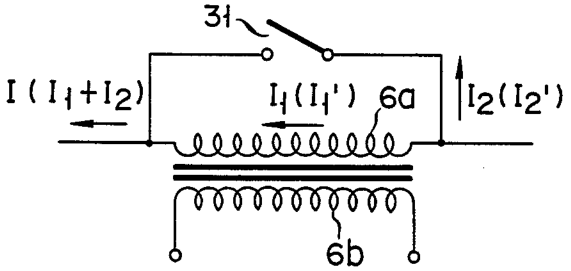
FIG. 11 illustrates currents represented in FIGS. 10A to 10D flowing through a portion of the circuit of FIG. 9.

The respective current waveforms shown in FIGS. 10A to 10D are apparent from FIG. 11. The current flowing through the primary winding *6a* is I1 or I1', and the current flowing through the switching circuit 31 is I2 or I2'. Therefore, a sum current I is I1+I2 or I1'+I2'.

Figure 12:
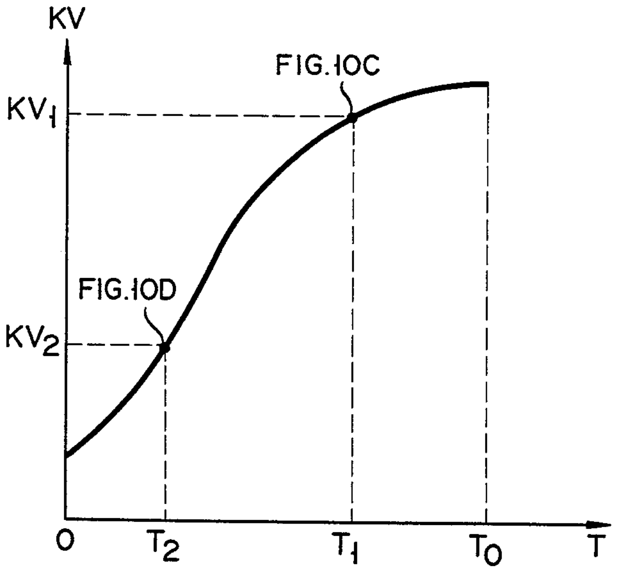
FIG. 12 is a characteristic curve of the X-ray tube voltage in kV at various switching times.

As can be seen from a graphic representation shown in FIG. 12, the switch-on timing of the circuit 31 can be freely set between 0, and T0, and therefore, the tube voltage kV can be varied in a wide range.

As previously described, the X-ray tube voltage can be varied by changing the turn-on periods of the thyristors 12 and 14 or by controlling the switch-on timing of the switching switching circuit 31. The former method causes the ripple components to be increased, as described above. Therefore, the repetition intervals of the drive pulses GP1 and GP2 applied to the gates of the thyristors 12 and 14 are set to be as short as possible, and these thyristors are driven at near the maximum turn-on frequencies. Thus, the switch-on timing of the switching circuit 31 is preferably controlled by the latter method. The variable width of the X-ray tube voltage can be further widened in combination of the former and latter methods, or stabilization by feedback from voltage dividing resistors 11*a* and 11*b* is also advantageous. In any case, desirable data are acquired by a microprocessor (μ-CPU) in the controller 19 so as to allow optimum control operation.

Operations of the DC high voltage generating apparatus 200 according to the second preferred embodiment will now be summarized.

The DC high voltage generating apparatus 200 includes a series resonance bridge inverter. The bridge inverter includes the transformer having the primary winding to which a DC low voltage is applied, a capacitor constituting a series resonant circuit together with the primary winding of the transformer, a thyristor bridge circuit for applying a DC low voltage to the resonant circuit at predetermined intervals, and a controller for supplying drive pulses to the thyristor bridge circuit so as to control the timing of the supply of the DC voltage. The apparatus 200 is characterized in that an inductor as a current limiter is inserted in series with the series resonance circuit, and a switching circuit is connected in parallel with the primary winding of the transformer so as to vary the DC high voltage for the X-ray tube.

The present invention is not limited to the specific embodiments, and therefore various changes and modifications may be made within the spirit and scope of the invention.

Figure 13:
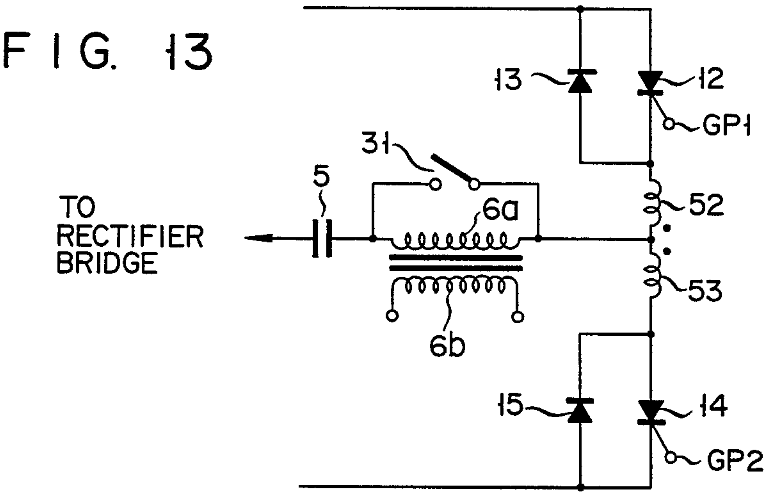
FIG. 13 is a circuit diagram of the modified series resonant circuit of the apparatus shown in FIG. 9.

For example, in the case of the inductor 50 connected in series with the second resonant circuit, two inductors 52 and 53 (FIG. 13) having opposite winding directions are series-connected between series circuits each consisting of a thyristor 12 (or 14) and a diode 13 (or 15), and a node between the series circuits is connected to the series resonant circuit. In this case, a di/dt withstand amount of the thyristors 12 and 14 has redundancy. When the winding directions of the inductors are set to be opposite to each other, the primary current flowing upon formation of a short circuit is buffered to some extent, as compared to the second embodiment. The circuit elements can thus be prevented from being damaged.

Figure 14:
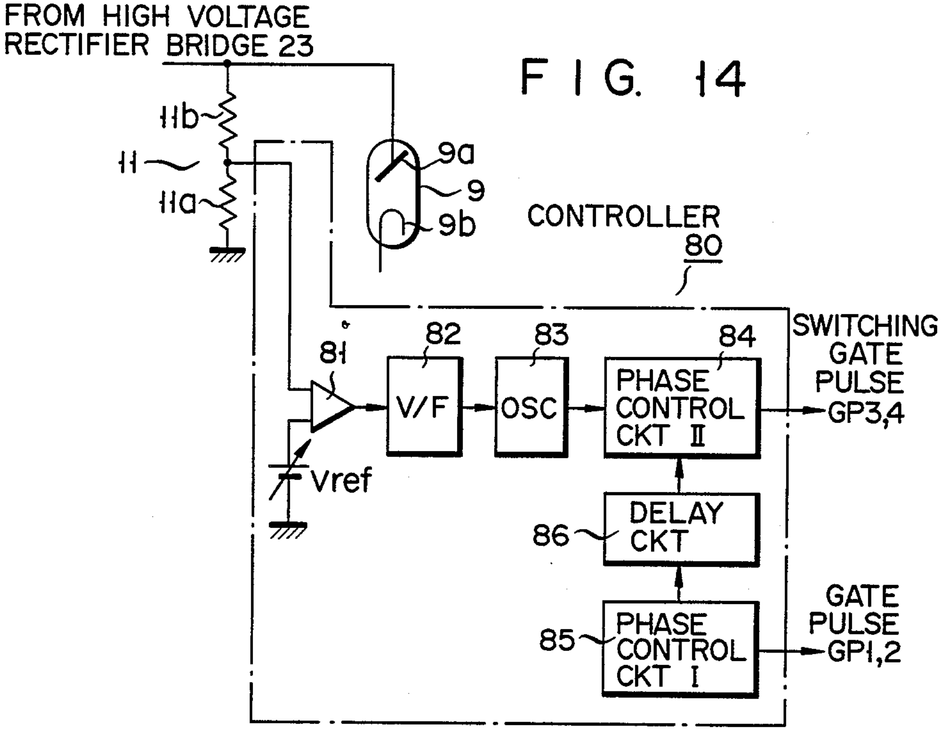
FIG. 14 is a block diagram of a modified controller for use in the present invention.

As shown in FIG. 14, a controller 80 for generating switching gate pulses GP3 and GP4 can be used. The controller 80 utilizes the detection voltage from the second detector 11 for detecting the anode voltage, and can stabilize the tube voltage (kV).

In the controller 80, a second detection voltage (having a value proportional to the tube voltage) from the detector 11 is compared with a reference level "Vref" in a comparator 81. The comparison result is converted in a corresponding frequency by a voltage-to-frequency converter 82. The oscillation output frequency of an oscillator 83 is synchronized by the output voltage having the converted frequency. In this manner, the oscillation output signal having a predetermined frequency is supplied to a phase control counter 84. In addition, a counter output obtained by delaying an output from a first phase counter 85 in a delay counter 86 is also supplied to the counter 84. As a result, the pulses GP3 and GP4 are generated at desired times. The counter 85 generates gate pulses GP1 and GP2 for the thyristors 12 and 14.

As described above, when the tube voltage is fed back so as to set switching timing, a more stable tube voltage can be obtained, and the ripple components can be considerably reduced.

As has been described above, according to the present invention, the switching circuit is connected in parallel with the primary winding of the transformer or the current limiter and a current limiter is inserted in series with the series resonant circuit. With this relatively simple method, an X-ray tube voltage can be varied in a wide range not only by application of timing control of a DC voltage to the series resonant circuit but also by switch-on timing control of a switching circuit. Thus, the ripple components of the X-ray tube voltage are reduced, and circuit elements can be prevented from being damaged by the current limiter. Therefore, a stable, inexpensive and compact DC high voltage generating apparatus can be realized.

What is claimed is:

1. A DC high voltage generating apparatus for an X-ray tube comprising:

primary rectifier means for rectifying a low AC voltage to derive a low DC voltage;

bridge inverter means including a single phase transformer having primary and secondary windings, a capacitive element series-connected via a current limiter to the primary winding so as to constitute a series resonant circuit, a bridge inverter circuit having switchable elements for inverting the low DC voltage into a pulsating low voltage, and a switching controller for controlling the switch-on times of the switchable elements;

secondary rectifier means for rectifying a high AC voltage induced at the secondary winding of the transformer by the pulsating low voltage into a high DC voltage for the X-ray tube; and switching means connected in parallel to the current limiter of the bridge inverter means, for changing the value of the pulsating low voltage induced at the primary winding by short-circuiting the current limiter so as to vary the high DC voltage derived from the secondary rectifier means.

2. An apparatus as claimed in claim 1, wherein the switching controller produces switching pulses for the switching means in response to the switch-on times of the switchable elements delayed by a predetermined time delay, a length of the time delay being changeable so as to vary the value of the pulsating low voltage.

3. An apparatus as claimed in claim 1, wherein the bridge inverter circuit is constituted by a thyristor bridge inverter having flywheel diodes cross-coupled to the respective thyristors.

4. An apparatus as claimed in claim 1, wherein the switching means is constituted by cross-coupled high-speed thyristors.

5. An apparatus as claimed in claim 1, further comprising:

first detector means including a current transformer for detecting the pulsating low voltage of the primary winding, and a current-to-voltage converter for converting a current signal of the current transformer into a voltage signal, the voltage signal being applied to the switching controller so as to control the switching times.

6. An apparatus as claimed in claim 1, further comprising a second detector for detecting the DC high voltage derived from the secondary rectifier means to supply a detection signal to the switching controller, thereby stabilizing the high DC voltage.

7. An apparatus as claimed in claim 1, wherein the current limiter is a resistor.

* * * * *